(12) United States Patent
Sakata

(10) Patent No.: US 10,688,829 B2
(45) Date of Patent: Jun. 23, 2020

(54) TIRE

(71) Applicant: TOYO TIRE & RUBBER CO., LTD., Itami-shi, Hyogo (JP)

(72) Inventor: Hirokazu Sakata, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 273 days.

(21) Appl. No.: 15/801,470

(22) Filed: Nov. 2, 2017

(65) Prior Publication Data

US 2018/0170112 A1    Jun. 21, 2018

(30) Foreign Application Priority Data

Dec. 21, 2016  (JP) .................................. 2016-247647

(51) Int. Cl.
| | | |
|---|---|---|
| *B60C 11/00* | (2006.01) | |
| *B60C 13/04* | (2006.01) | |
| *B60C 13/02* | (2006.01) | |
| B60C 9/00 | (2006.01) | |

(52) U.S. Cl.
CPC ........ *B60C 11/005* (2013.01); *B60C 11/0058* (2013.01); *B60C 11/0075* (2013.01); *B60C 13/02* (2013.01); *B60C 13/04* (2013.01); *B60C 2009/0078* (2013.01); *B60C 2011/0025* (2013.01); *B60C 2011/0091* (2013.01)

(58) Field of Classification Search
CPC ..... B60C 11/005; B60C 11/0008–0075; B60C 2011/0025; B60C 2011/0041; B60C 2011/0091; B60C 11/0058; B29D 30/60
USPC .................................................. 156/117, 130
See application file for complete search history.

(56) References Cited

U.S. PATENT DOCUMENTS

2013/0133812 A1 *  5/2013  Abe ....................... B29D 30/10
                                                                                  156/117

FOREIGN PATENT DOCUMENTS

| JP | 62059105 A | * | 3/1987 | |
|---|---|---|---|---|
| JP | 2004345432 A | * | 12/2004 | |
| JP | 2006-168564 A | | 6/2006 | |
| JP | 2006168564 A | * | 6/2006 | |
| WO | WO-2010134379 A1 | * | 11/2010 | ............. B29D 30/60 |

* cited by examiner

*Primary Examiner* — Robert C Dye
*Assistant Examiner* — Farah Taufiq
(74) *Attorney, Agent, or Firm* — Westerman, Hattori, Daniels & Adrian, LLP

(57) ABSTRACT

A tire includes a tread rubber which is formed by a plurality kinds of rubber having different elastic modulus, the tread rubber is provided with peripheral joint portions where the plurality kinds of rubber having the different elastic modulus is joined in a tire peripheral direction, and a ground end portion of an outside surface of the tread rubber in a tire width direction is formed by the rubber having the greatest elastic modulus among the plurality kinds of rubber constructing the peripheral joint portions.

12 Claims, 7 Drawing Sheets

TIRE

CROSS REFERENCE TO RELATED APPLICATIONS

This application claims the benefit of priority of Japanese application no. 2016-247647, filed on Dec. 21, 2016, which is incorporated herein by reference.

BACKGROUND OF THE INVENTION

Field of the Invention

The present invention relates to a tire having a tread rubber which is formed by a plurality kinds of rubber having different elastic modulus.

Description of the Related Art

There has been conventionally known a tire having a tread rubber which is formed by two different kinds of rubber, as a tire (for example, JP-A-2006-168564). Further, the tire is provided with a plurality of grooves on an outer surface of the tread rubber, and has an edge effect (an effect of generating a grip force against a road surface by scratch on the road surface by the edge at the traveling time) achieved by the grooves.

In the meantime, there is a case that the tread rubber cannot be elastically deformed sufficiently since a temperature of the tread rubber is low at an early stage of an operation (at a time that the temperature of the tire is low). As a result, there is a case that the edge effect generated by the grooves cannot be sufficiently achieved since the tread rubber does not sufficiently ground on the road surface over all.

SUMMARY OF THE INVENTION

Accordingly, an object of the present invention is to provide a tire which can further raise a temperature of the tread rubber at an early stage of an operation.

Means for Solving the Problem

There is provided a tire, which includes:

a tread rubber which is formed by a plurality kinds of rubber having different elastic modulus, wherein the tread rubber is provided with peripheral joint portions where the plurality kinds of rubber having the different elastic modulus is joined in a tire peripheral direction, and wherein a around end portion of an outside surface of the tread rubber in a tire width direction is formed by the rubber having the greatest elastic modulus among the plurality kinds of rubber constructing the peripheral joint portions.

Further, the tire according to the present invention may have a configuration in which:

the tread rubber is provided with an outer layer which has an outside surface in a tire radial direction and an inner layer which is adjacent to the outer layer in an inner side in the tire radial direction, and wherein a total area of the peripheral joint portions in the outer layer is smaller than a total area of the peripheral joint portions in the inner layer.

Further, the tire according to the present invention may have a configuration in which:

an outside surface of the tread rubber is provided with an adjacent portion which is adjacent to the ground end portion in an inner side in a tire width direction, wherein the adjacent portion is formed by the rubber having a smaller elastic modulus than the elastic modulus of the rubber which forms the ground end portion, and wherein a dimension of the ground end portion in the tire width direction is greater than a dimension of the adjacent portion in the tire width direction.

Further, the tire according to the present invention may have a configuration in which:

the tread rubber is provided with width joint portions where the plurality kinds of rubber having the different elastic modulus is joined in the tire width direction, and wherein a total area of the width joint portions in the outer layer is smaller than a total area of the width joint portions in the inner layer.

Further, the tire according to the present invention may have a configuration in which:

the tread rubber is formed by spirally winding a plurality of ribbon rubbers along a tire peripheral direction, wherein the ribbon rubbers are provided with parallel portions which are arranged in parallel to the tire peripheral direction, and inclined portions which are arranged so as to be inclined to the tire peripheral direction, wherein the peripheral joint portions are formed so that the inclined portions are joined to each other in the tire peripheral direction, and wherein the width joint portions are formed by joining the parallel portions to each other in the tire width direction.

Further, the tire according to the present invention may have a configuration in which:

the tread rubber is provided with a plurality of peripheral grooves which extend along the tire peripheral direction, and wherein a peripheral groove arranged in the outermost side in the tire width direction is arranged in the ground end portion.

As mentioned above, the tire can achieve an excellent effect that the temperature of the tread rubber can be further raised at an early stage of the operation.

DETAILED DESCRIPTION OF THE INVENTION

Figure 1:
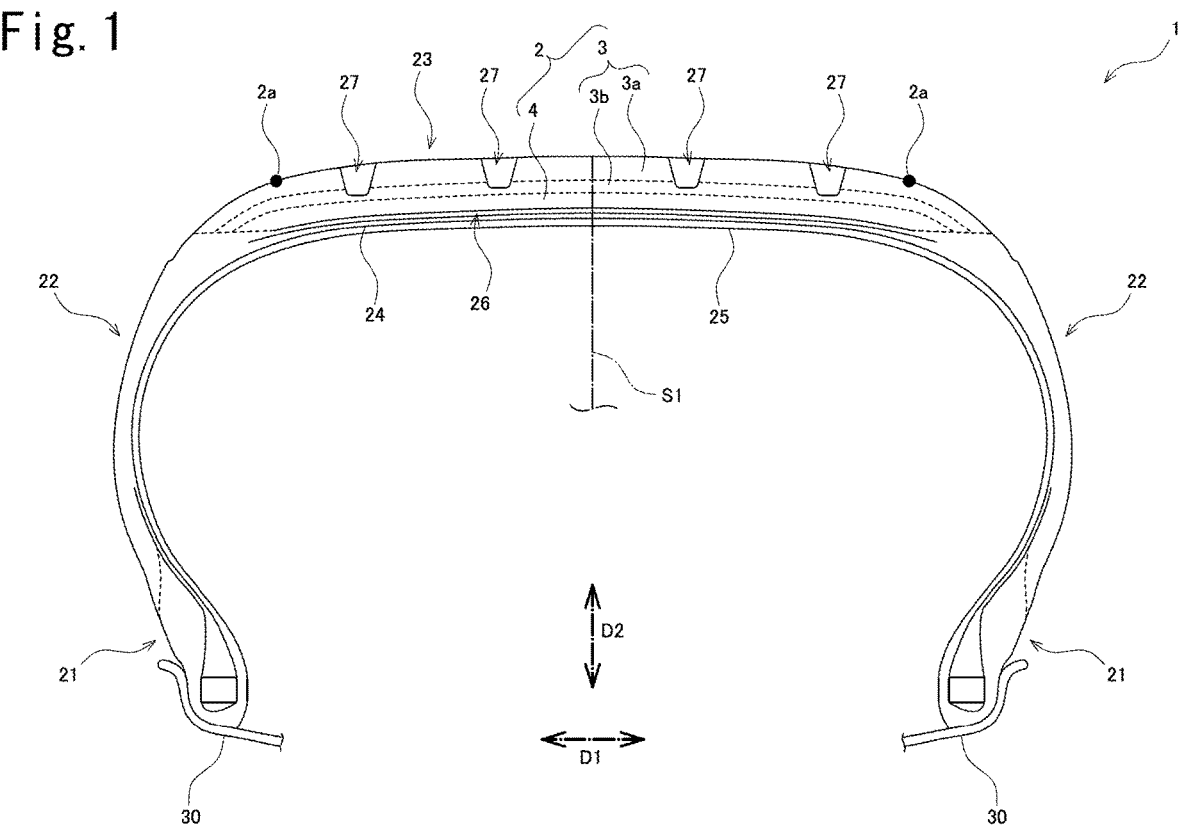
FIG. 1 is a cross sectional view of a substantial part in a tire meridian surface of a tire according to an embodiment.

A description will be given below of an embodiment in a tire with reference to FIGS. 1 to 6. In each of the drawings (same applies to FIGS. 7 to 9), an actual dimensional ratio does not necessarily coincide with a dimensional ratio of the drawing, and the dimensional ratio does not coincide between the drawings.

As shown in FIG. 1, a tire 1 according to the present embodiment is provided with a pair of bead portions 21 which have beads, side wall portions 22 which extend to outer sides in a tire radial direction D2 from the respective bead portions 21, and a tread portion 23 which is connected to outer end portions of the pair of side wall portions 22 in the tire radial direction D2 and is grounded on a road surface in an outside surface (a tread surface) in the tire radial direction D2. In the present embodiment, the tire 1 is a pneumatic tire which is internally filled with air, and is installed to a rim 30.

Further, the tire 1 is provided with a carcass layer 24 which is bridged between a pair of beads, and an inner liner 25 which is arranged in an inner side of the carcass layer 24 and is excellent in a function of blocking gas transmission for retaining the pneumatic pressure. The carcass layer 24 and the inner liner 25 are arranged along a tire inner periphery over the bead portions 21, the side wall portions 22 and the tread portion 23.

In FIG. 1 (same applies to the following drawings), a first direction D1 is a tire width direction D1 which is parallel to a tire rotation axis, a second direction D2 is a tire radial direction D2 which corresponds to a diametrical direction of the tire 1, and a third direction D3 (refer to FIGS. 2 to 4) is a tire peripheral direction D3 which is around the tire rotation axis. Further, a tire equator surface S1 is a surface which is orthogonal to the tire rotation axis and is also a surface which is positioned at the center in the tire width direction D1, and a tire meridian surface S2 (refer to FIGS. 2 to 4) is a surface which includes the tire rotation axis and is also a surface which is orthogonal to the tire equator surface S1.

The tread portion 23 is provided with a tread rubber 2 which is grounded on the road surface in an outside surface, and a belt layer 26 which is arranged between the tread rubber 2 and the carcass layer 24. Further, the tread portion 23 is provided with a plurality of peripheral grooves 27 which extend along a tire peripheral direction D3, and a plurality of land grooves (not shown) which extend so as to intersect the tire peripheral direction D3, on an outside surface thereof.

The tread rubber 2 is provided with a cap rubber 3 which has an outside surface in the tire radial direction D2, and a base rubber 4 which is arranged between the cap rubber 3 and the belt layer 26. Further, the cap rubber 3 is provided with an outer layer 3a which has an outside surface in the tire radial direction D2, and an inner layer 3b which is adjacent to the outer layer 3a in an inner side in the tire radial direction D2. In the present embodiment, the tread rubber 2 is formed into a three-layer structure which is constructed by the outer layer 3a, the inner layer 3b and the base rubber 4.

The tread rubber 2 has in an outside surface a ground surface which is grounded on the road surface, and outside ends in the tire width direction D1 on the ground surface are called as ground ends 2a and 2a. The ground surface means a tread surface which is grounded on the road surface in the case that the tire 1 is put to be vertical to the flat road surface in a state in which the tire 1 is assembled in the normal rim 30 and is filled with the normal internal pressure, and the normal load is applied to the tire 1.

The normal rim 30 is the rim 30 which is defined by a standard for the tire 1 in a standard system including the standard on which the tire 1 is based, for example, a standard rim in JATMA, "Design Rim" in TRA and "Measuring Rim" in ETRTO.

The normal internal pressure is the pneumatic pressure which is defined by the standard for the tire 1 in the standard system including the standard on which the tire 1 is based, and is a maximum pneumatic pressure in JATMA, a maximum value described in Table "TIRE LOAD LIMITS AT VARIOUS COLD INFLATION PRESSURES" in TRA, and "INFLATION PRESSURE" in ETRTO, however, is set to 180 KPa in the case that the tire 1 is provided for a passenger car.

The normal load is the load which is defined by the standard for the tire 1 in the standard system including the standard on which the tire 1 is based, and is a maximum load capacity in JATMA, a maximum value described in the above-described Table in TRA, and "LOAD CAPACITY" in ETRTO, however, is set to 85% of a corresponding load to the internal pressure 180 KPa in the case that the tire 1 is provided for a passenger car.

Figure 2:
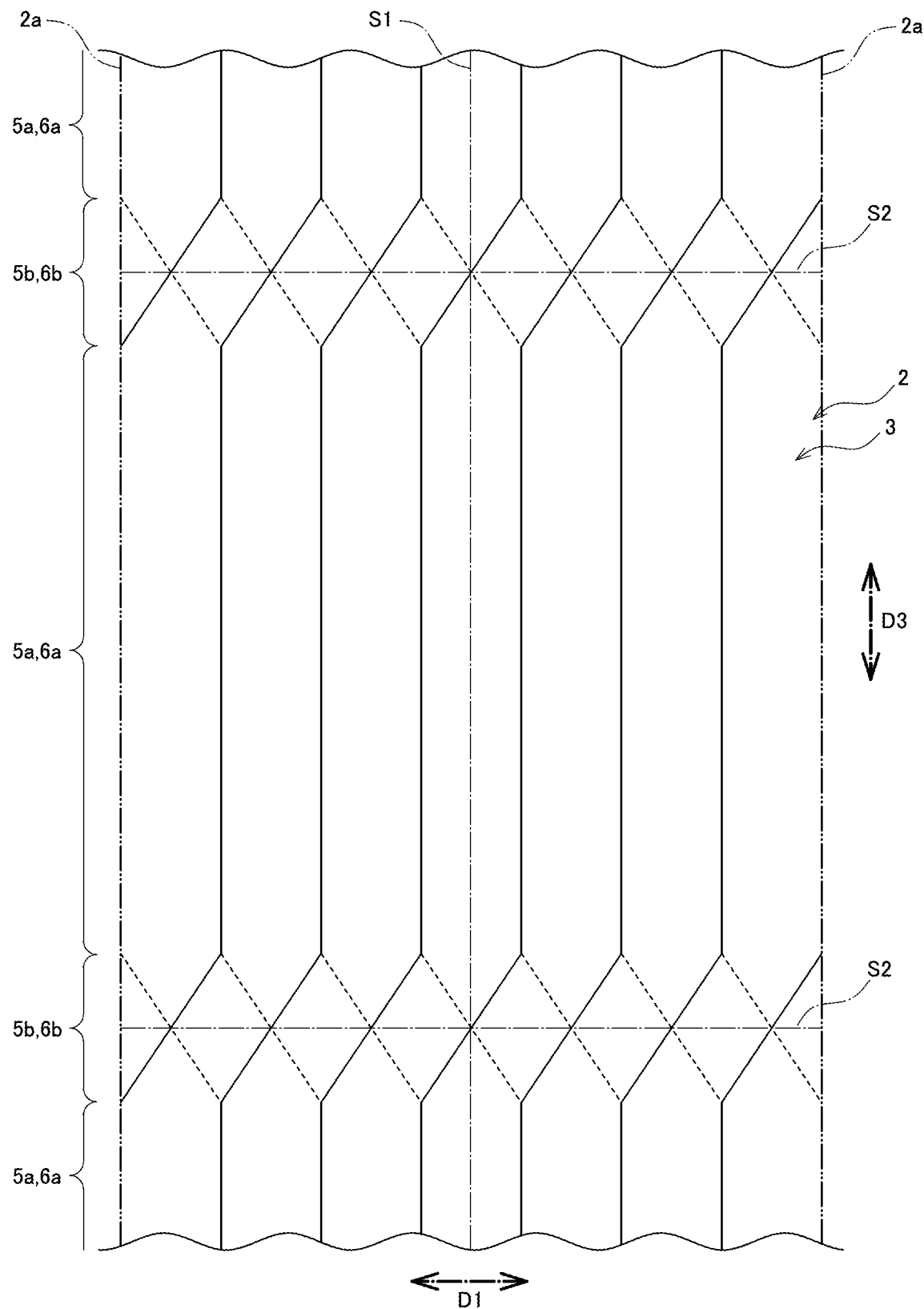
FIG. 2 is a development view of a substantial part of a tread rubber according to the embodiment.
Figure 3:
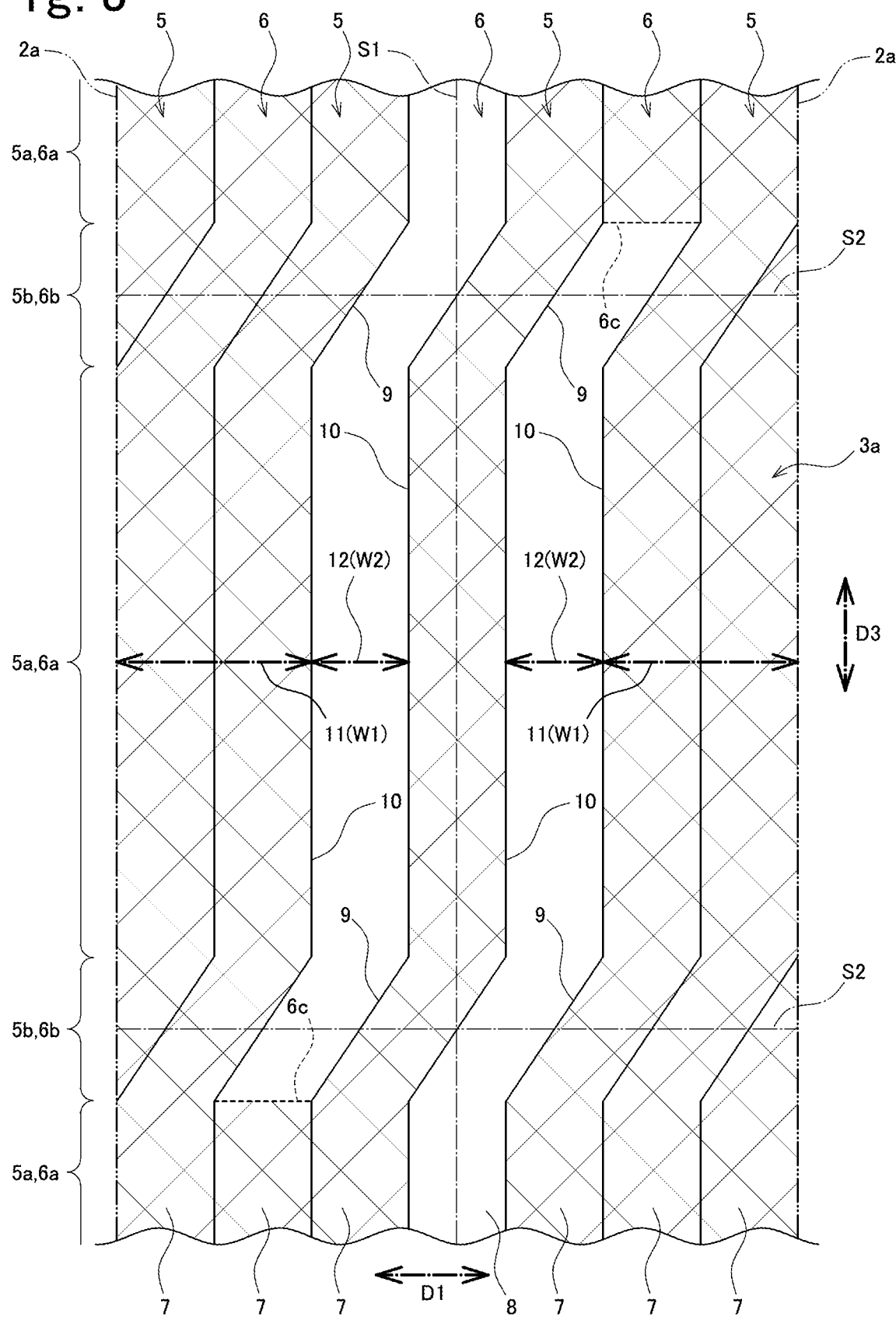
FIG. 3 is a development view of a substantial part of an outer layer of a cap rubber according to the embodiment, and is a drawing for describing a layout of rubber.
Figure 4:
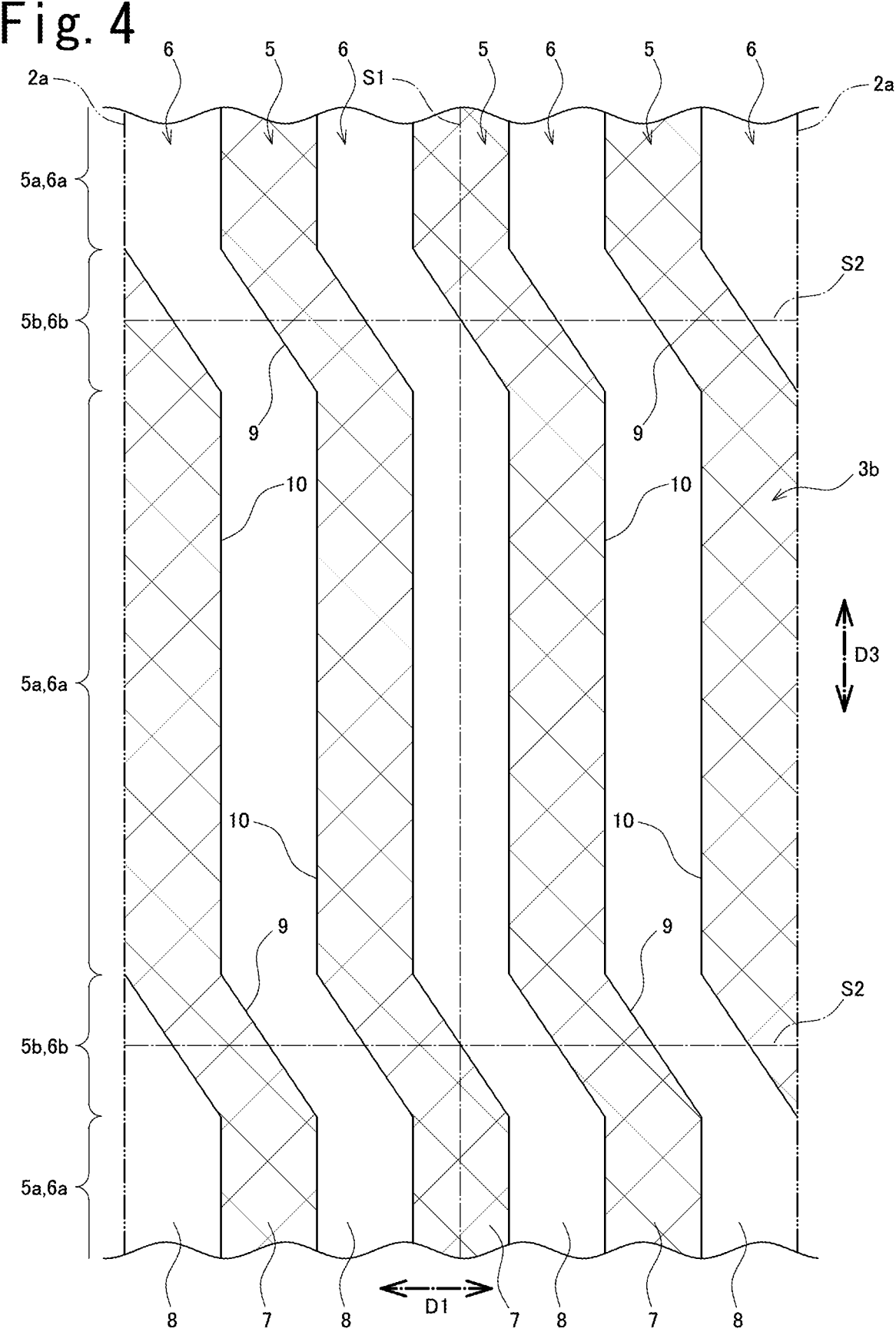
FIG. 4 is a development view of a substantial part of an inner layer of the cap rubber according to the embodiment, and is a drawing for describing a layout of rubber.

As shown in FIGS. 2 to 4, the cap rubber 3 is formed by spirally winding first and second ribbon rubbers 5 and 6 along the tire peripheral direction D3. Further, the cap rubber 3 is formed by winding the first and second ribbon rubbers 5 and 6 to form two layers in the tire radial direction D2. As a result, the cap rubber 3 is formed into a two-layer structure which is constructed by an outer layer 3a and an inner layer 3b.

FIG. 3 shows a layout of the first and second ribbon rubbers 5 and 6 in the outer layer 3a, and FIG. 4 shows a layout of the first and second ribbon rubbers 5 and 6 in the inner layer 3b at the same position as FIG. 3. Further, in FIGS. 2 to 4, a plane S2 indicates a predetermined (same) tire meridian surface S2.

Cross sectional shapes of the first and second ribbon rubbers 5 and 6 are approximately the same. More specifically, dimensions of the first and second ribbon rubbers 5 and 6 in the respective directions D1 and D2 are approximately the same. The cross sectional shapes of the first and second ribbon rubbers 5 and 6 can be formed into various cross sectional shapes in correspondence to an aspect of the tread rubber 2 (the cap rubber 3) to be formed. For example, the cross sectional shapes of the first and second ribbon rubbers 5 and 6 can be formed into an approximately triangular shape, an approximately trapezoidal shape and a tabular shape.

In the meantime, the cap rubber 3 is formed by first and second rubbers 7 and 8 which have different elastic modulus. The elastic modulus of the first rubber 7 is greater than the elastic modulus of the second rubber 8. Further, in FIGS. 3 and 4 (same applies to the following drawings), the first rubber 7 is illustrated by a hatching area, and the second rubber 8 is illustrated by a plain area. In the present embodiment, the first ribbon rubber 5 is formed only by the first rubber 7 and the second ribbon rubber 6 is formed by the first rubber 7 and the second rubber 8 (a broken line in FIG. 3 indicates a boundary portion 6c between the first rubber 7 and the second rubber 8).

The elastic modulus is a tensile elastic modulus and is a value obtained by measuring at a room temperature (25° C.) according to a method which is defined in JIS K6251. For example, the elastic modulus of the first rubber 7 is preferably between 1.2 times and 5.0 times of the elastic modulus of the second rubber 8. Further, for example, a 100% tensile elastic modulus of the first rubber 7 is preferably between 0.6 MPa and 17.5 MPa, and a 100% tensile elastic modulus of the second rubber 8 is preferably between 0.5 MPa and 3.5 MPa.

The respective ribbon rubbers 5 and 6 are provided with parallel portions 5a and 6a which are arranged in parallel to the tire peripheral direction D3, and inclined portions 5b and 6b which are arranged so as to be inclined to the tire peripheral direction D3. Further, the respective ribbon rubbers 5 and 6 are arranged so that the parallel portions 5a and 6a and the inclined portions 5b and 6b are repeatedly connected.

Further, each of the parallel portions 5a and 6a and the inclined portions 5b and 6b of the first and second ribbon rubbers 5 and 6 is alternately arranged in the tire width direction D1. The dimension of the parallel portions 5a and 6a in the tire peripheral direction D3 is greater than the dimension of the inclined portions 5b and 6b in the tire peripheral direction D3.

An inside area of the outer layer 3a in the tire width direction D1 and a whole area of the inner layer 3b in the tire width direction D1 are provided with a plurality of peripheral joint portions 9 where the first rubber 7 and the second rubber 8 are joined in the tire peripheral direction D3. The peripheral joint portion 9 is formed by joining the inclined portion 5b which is formed by the first rubber 7 of the first ribbon rubber 5 and the inclined portion 6b which is formed by the second rubber 8 of the second ribbon rubber 6 in the tire peripheral direction D3.

Further, the peripheral joint portion 9 is arranged so as to intersect the tire peripheral direction D3. Specifically, the peripheral joint portion 9 is arranged so as to be inclined to and intersect the tire peripheral direction D3. For example, an intersecting angle of the peripheral joint portion 9 in the tire peripheral direction D3 is preferably equal to or more than 20 degrees, and is more preferably equal to or more than 30 degrees, and is still more preferably equal to or more than 45 degrees.

In the present embodiment, the plural peripheral joint portions 9 are arranged side by side in the tire width direction D1, and are arranged respectively at predetermined positions of the tire meridian surface S2. More specifically, a first group (the upper side peripheral joint portions 9 in FIGS. 3 and 4) of the peripheral joint portions 9 are arranged to be away from a second group (the lower side peripheral joint portions 9 in FIGS. 3 and 4) of the peripheral joint portions 9 at a distance corresponding to about 180 degrees in the tire peripheral direction D3.

Further, the inside area of the outer layer 3a in the tire width direction D1 and the whole area of the inner layer 3b in the tire width direction D1 are provided with a plurality of width joint portions 10 where the first rubber 7 and the second rubber 8 are joined in the tire width direction D1. The width joint portion 10 is formed by joining the parallel portion 5a which is formed by the first rubber 7 of the first ribbon rubber 5 and the parallel portion 6a which is formed by the second rubber 8 of the second ribbon rubber 6 in the tire width direction D1.

Further, the width joint portion 10 is arranged so as to intersect in the tire width direction D1. The width joint portion 10 includes a portion which is arranged so as to slightly intersect in the tire peripheral direction D3. For example, the width joint portion 10 includes a portion in which an intersecting angle in the tire peripheral direction D3 is less than 10 degrees.

A ground end portion 11 corresponding to an outside area of the outer layer 3a in the tire width direction D1 is formed by the first rubber 7 having the greater elastic modulus among the first rubber 7 and the second rubber 8. Specifically, the ground end portion 11 is formed by a portion which is formed by the first rubber 7 of the first ribbon rubber 5 and a portion which is formed by the first rubber 7 of the second ribbon rubber 6.

Therefore, the first rubber 7 constructing the ground end portion 11 is the rubber having the greatest elastic modulus among the rubbers 7 and 8 which construct the peripheral joint portion 9. Further, the first rubber 7 constructing the ground end portion 11 is the rubber having the greatest elastic modulus among the rubbers 7 and 8 which construct the cap rubber 3. The around end portion 11 is an area of an outside end portion in the tire width direction D1 in the ground surface where the tread rubber 2 grounds on the road surface. More specifically, an outside end edge of the ground end portion 11 in the tire width direction D1 is the around end 2a.

Further, the outer layer 3a is provided with an adjacent portion 12 which is adjacent to the around end portion 11 in an inner side in the tire width direction D1. The adjacent portion 12 is formed by the second rubber 8 having the smaller elastic modulus than the elastic modulus of the first rubber 7 which forms the ground end portion 11. Further, a dimension W1 of the ground end portion 11 in the tire width direction D1 is greater than a dimension W2 of the adjacent portion 12 in the tire width direction D1.

As mentioned above, since the outer layer 3a is provided with the ground end portion 11 which is formed only by the first rubber 7, the number of the peripheral joint portions 9 in the outer layer 3a is less than the number of the peripheral joint portions 9 in the inner layer 3b. Therefore, a total area of the peripheral joint portions 9 in the outer layer 3a is smaller than a total area of the peripheral joint portions 9 in the inner layer 3b.

Further, a total area of the width joint portions 10 in the outer layer 3a is smaller than a total area of the width joint portions 10 in the inner layer 3b. Therefore, a total area of the joint portions 9 and 10 in the outer layer 3a is smaller than a total area of the joint portions 9 and 10 in the inner layer 3b.

The base rubber 4 is formed by one kind of rubber having a predetermined elastic modulus. For example, the base rubber 4 is formed by winding one piece of band-shaped rubber so as to arrange along the tire peripheral direction D3. In the present embodiment, the elastic modulus of the first rubber 7 and the second rubber 8 is greater than the elastic modulus of the rubber which forms the base rubber 4. Therefore, in the present embodiment, the first rubber 7 constructing the ground end portion 11 is a rubber having the greatest elastic modulus among the rubbers 4, 7 and 8 which construct the tread rubber 2.

The structure of the tire 1 according to the present embodiment is as described above, and a description will be given next of an operation and effect of the tire 1 according to the present embodiment.

First of all, since the tire 1 is exposed to the force in the tire peripheral direction D3 and the tire width direction D1 when the vehicle travels, the peripheral joint portion 9 and the width joint portion 10 are elastically deformed. At this time, the peripheral joint portion 9 and the width joint portion 10 are elastically deformed in such a manner as to strain since the peripheral joint portion 9 and the width joint portion 10 are formed by joining the rubbers 7 and 8 having the different elastic modulus. As a result, since the peripheral joint portion 9 and the width joint portion 10 generate heat, the temperature of the tread rubber 2 can be raised at an early stage of the operation.

Therefore, since the tread rubber 2 has a sufficient temperature even at an early stage of the operation, the tread rubber 2 can be elastically deformed sufficiently. As a result, the outside surface of the tread rubber 2 can be grounded on the road surface over all. As a result, for example, the edge effect obtained by the grooves (the peripheral grooves 27 and the land grooves) can be sufficiently achieved, and it is possible to improve a steering stability at an early stage of the operation.

In the meantime, the ground end portion 11 in the outer side in the tire width direction D1 in relation to a center of turn is exposed to the great force when turning on the dry road surface. Further, when braking on the dry road surface, both the ground end portions 11 and 11 corresponding to the outer side in the tire width direction D1 are exposed to the comparatively great force. Therefore, the grounding length of the around end portion 11 is elongated. In correspondence to this, the ground end portion 11 is formed by the first rubber 7 having the great elastic modulus.

As a result, the ground end portion 11 in the outer side in the tire width direction D1 in relation to the center of turn is exposed to the great force when turning on the dry road surface, but can be inhibited from being deformed too much. Further, both the ground end portions 11 and 11 are exposed to the comparatively great force when braking on the dry road surface, but can be inhibited from being deformed too much. Therefore, it is possible to improve the steering stability (a turning performance and a braking performance) in relation to the dry road surface.

Further, since the dimension of the ground end portion 11 in the tire width direction D1 is enlarged, an area which can be suppressed deformation is enlarged in the outer side in the tire width direction D1 when turning on the dry road surface and braking on the dry road surface. Therefore, it is possible to further improve the steering stability (the turning performance and the braking performance) in relation to the dry road surface.

Since the peripheral joint portion 9 and the width joint portion 10 generate heat, the steering stability is improved at an early stage of the operation, however, a rolling resistance after the temperature of the tire 1 rises sufficiently is increased. Then, the total area of the peripheral joint portion 9 and the width joint portion 10 in the outer layer 3*a* becomes smaller than the total area of the peripheral joint portion 9 and the width joint portion 10 in the inner layer 3*b*.

As a result, since the outer layer 3*a* grounding on the road surface has a small area which is elastically deformed by the peripheral joint portion 9 and the width joint portion 10, it is possible to reduce an energy loss caused by the heat generation. On the other hand, since the inner layer 3*b* which is not grounded on the road surface has a great area which is elastically deformed by the peripheral joint portion 9 and the width joint portion 10, it is possible to securely generate heat at an early stage of the operation. As mentioned above, it is possible to securely improve the steering stability at an early stage of the operation while suppressing the rolling resistance of the tire 1 from being increased.

Further, in the present embodiment, peripheral grooves 27 arranged in an outermost side in the tire width direction D1 are arranged in the ground end portion 11. More specifically, the peripheral grooves 27 are arranged to be away from the peripheral joint portion 9 and the width joint portion 10. As a result, since the joint portions 9 and 10 are away from the peripheral grooves 27 which tend to be greatly deformed, it is possible to inhibit a crack from being generated due to the joint portions 9 and 10.

Next, a description will be given of a method of manufacturing the tire 1 according to the present embodiment with reference to FIGS. 5 and 6.

Figure 5:
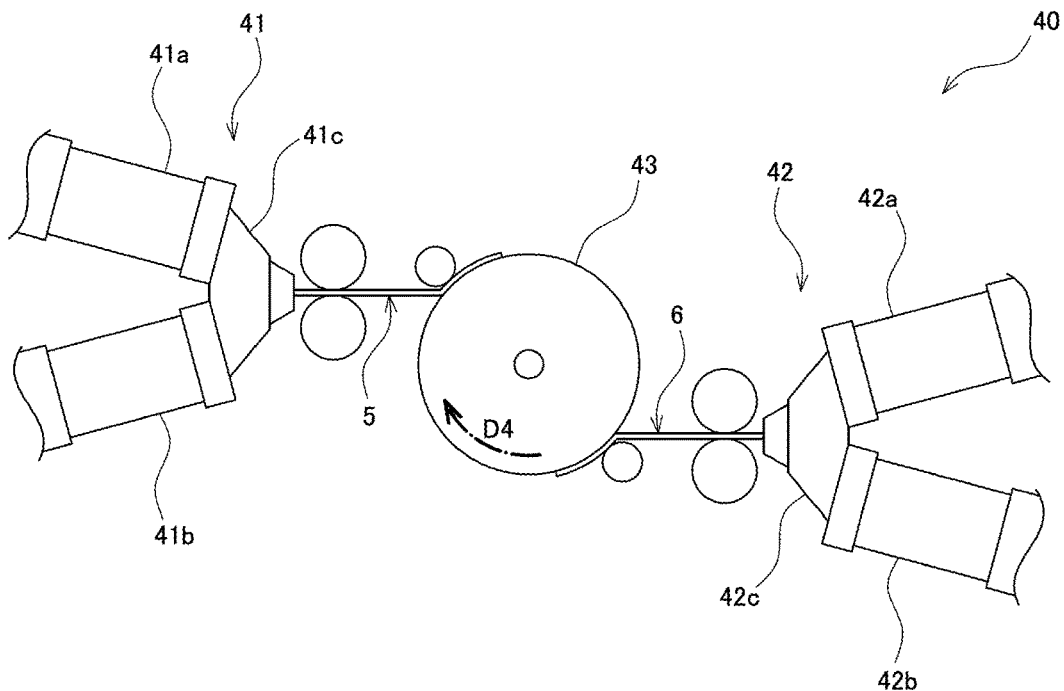
FIG. 5 is a schematic view describing a method of manufacturing the tire according to the embodiment.

As shown in FIG. 5, a molding device 40 is provided with a first extruding device 41 which extrudes the first ribbon rubber 5, and a second extruding device 42 which extrudes the second ribbon rubber 6. Further, the molding device 40 is provided with a winding portion 43 to which the cord-shaped ribbon rubbers 5 and 6 formed by being extruded out of the respective extruding devices 41 and 42 are wound.

The extruding devices 41 and 42 extrude the rubbers 7 and 8 in such a manner that the cross sectional shapes of the ribbon rubbers 5 and 6 come to the fixed shapes. Further, the extruding devices 41 and 42 extrude the rubbers 7 and 8 in such a manner that extruding amounts of the rubbers 7 and 8 per unit time are fixed. Further, the first extruding device 41 and the second extruding device 42 are arranged so as to be opposed in a diametrical direction of the winding portion 43 via the winding portion 43.

The extruding devices 41 and 42 are provided with first extruding portions 41*a* and 42*a* which extrude the first rubber 7, second extruding portions 41*b* and 42*b* which extrude the second rubber 8, and switch portions 41*c* and 42*c* which switch the rubbers 7 and 8 to be extruded to the outer portion. In the present embodiment, the first extruding device 41 extrudes the first ribbon rubber 5 which is constructed only by the first rubber 7, and the second extruding device 42 extrudes the second ribbon rubber 6 in which the first rubber 7 and the second rubber 8 are alternately connected.

The winding portion 43 is formed into a columnar shape, and can rotate around an axis (in a rotating direction D4). As a result, the ribbon rubbers 5 and 6 formed by being extruded on the basis of the rotation of the winding portion 43 are wound to the outer peripheral portion of the winding portion 43. Further, since the winding portion 43 is movable in the axial direction, the winding portion 43 can relatively displace in the axial direction in relation to the extruding devices 41 and 42.

Further, when the winding portion 43 is immovable in relation to the extruding devices 41 and 42, the parallel portions 5*a* and 6*a* of the ribbon rubbers 5 and 6 are formed, and when the winding portion 43 moves in the axial direction in relation to the extruding devices 41 and 42, the inclined portions 5*b* and 6*b* of the ribbon rubbers 5 and 6 are formed. As a result, as shown in FIG. 6, the ribbon rubbers 5 and 6 are arranged in such a manner that the parallel portions 5*a* and 6*a* and the inclined portions 5*b* and 6*b* are repeatedly connected, and the parallel portions 5*a* and 6*a* and the inclined portions 5*b* and 6*b* of the first and second ribbon rubbers 5 and 6 are arranged alternately in the tire width direction D1.

Further, since the inclined portion 5*b* formed by the first rubber 7 in the first ribbon rubber 5 and the inclined portion 6*b* formed by the second rubber 8 in the second ribbon rubber 6 are joined in the tire peripheral direction D3, the peripheral joint portions 9 are formed. Further, since the parallel portion 5*a* formed by the first rubber 7 in the first ribbon rubber 5 and the parallel portion 6*a* formed by the second rubber 8 in the second ribbon rubber 6 are joined in the tire width direction D1, the width joint portions 10 are formed. The peripheral joint portions 9 are arranged to be away at a distance corresponding to 180 degrees in the tire peripheral direction D3.

Figure 6:
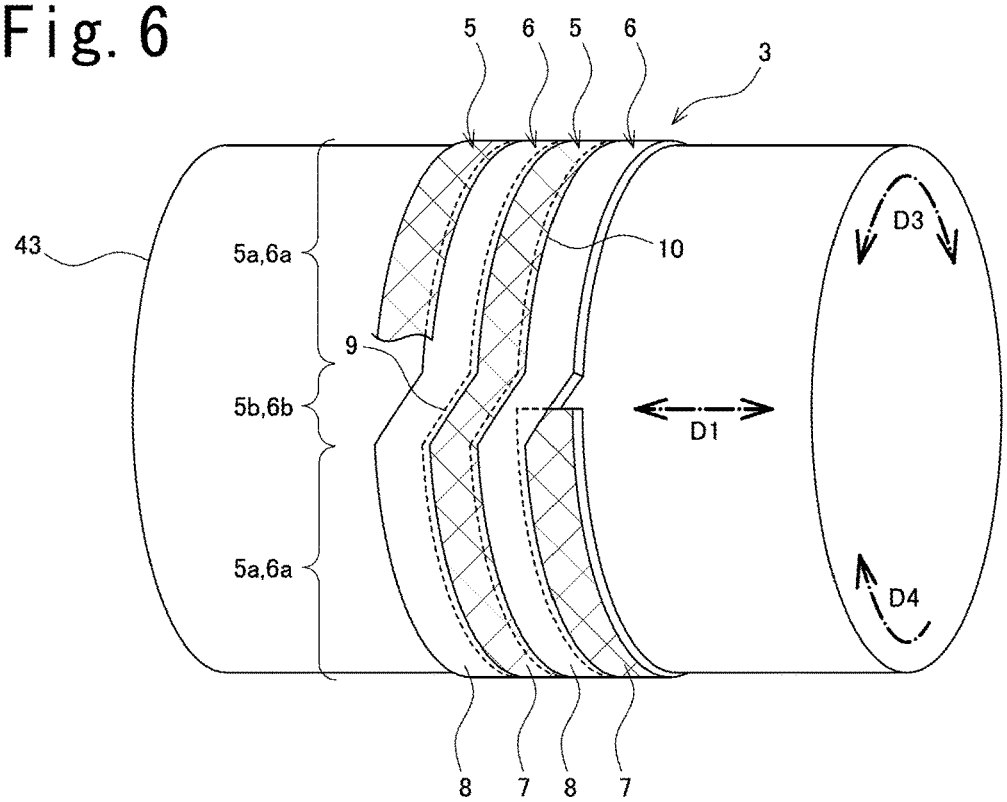
FIG. 6 is a schematic view describing the method of manufacturing the tire according to the embodiment.

In FIG. 6, the other members than the cap rubber 3 are not illustrated. For example, the rubber member constructing the base rubber 4 may be wound to the winding portion 43, and the ribbon rubbers 5 and 6 may be wound from the above of the rubber member.

Thereafter, the first and second ribbon rubbers 5 and 6 are wound to form two layers in the tire radial direction D2, although not being illustrated. Further, an unvulcanized tire is formed, for example, via a step of being expanded and deformed. Further, since the unvulcanized tire is vulcanized by a vulcanizing device, the vulcanized tire 1 is manufactured.

As described above, the tire 1 of the embodiment include: a tread rubber 2 which is formed by a plurality kinds of rubber 7 and 8 having different elastic modulus, wherein the tread rubber 2 is provided with peripheral joint portions 9 where the plurality kinds of rubber 7 and 8 having the different elastic modulus is joined in a tire peripheral direction D3, and wherein a ground end portion 11 of an outside surface of the tread rubber 2 in a tire width direction D1 is formed by the rubber 7 having the greatest elastic modulus among the plurality kinds of rubber 7 and 8 constructing the peripheral joint portions 9.

According to the structure mentioned above, since the tire 1 is exposed to the force in the tire peripheral direction D3 when the vehicle travels, the peripheral joint portion 9 is elastically deformed in the tire peripheral direction D3. Further, the peripheral joint portion 9 is elastically deformed so as to strain since the rubbers 7 and 8 having the different elastic modulus are joined in the tire peripheral direction D3. As a result, since the peripheral joint portion 9 generates heat, it is possible to further raise the temperature of the tread rubber 2.

Further, the ground end portion 11 in the tire width direction D1 of the outside surface of the tread rubber 2 is formed by the rubber 7 having the greatest elastic modulus among the rubbers 7 and 8 which construct the peripheral joint portion 9. As a result, the ground end portion 11 in the outer side of the tire width direction D1 in relation to the center of turn can be inhibited from being deformed against the exposure of the great force when turning on the dry road surface. Therefore, it is possible to improve the turning performance on the dry road surface.

Further, both the ground end portions 11 and 11 in the outer side of the tire width direction D1 can be inhibited from being deformed against the exposure of the comparatively great force when braking on the dry road surface. Therefore, it is possible to improve the braking performance on the dry road surface. As mentioned above, it is possible to further improve the steering stability (the turning performance and the braking performance) on the dry road surface.

In the tire 1 of the embodiment, the tread rubber 2 is provided with an outer layer 3a which has an outside surface in a tire radial direction D2 and an inner layer 3b which is adjacent to the outer layer 3a in an inner side in the tire radial direction D2, and wherein a total area of the peripheral joint portions 9 in the outer layer 3a is smaller than a total area of the peripheral joint portions 9 in the inner layer 3b.

According to the structure mentioned above, the total area of the peripheral joint portions 9 in the outer layer 3a is smaller than the total area of the peripheral joint portions 9 in the inner layer 3b. As a result, since the outer layer 3a grounding on the road surface is small in the area which is elastically deformed due to the peripheral joint portions 9, it is possible to make an energy loss caused by the heat generation small. Therefore, it is possible to inhibit a rolling resistance of the tire 1 from being increased.

On the other hand, since the inner layer 3b which does not ground on the road surface is great in the area which is elastically deformed due to the peripheral joint portions 9, it is possible to securely generate heat at an early stage of the operation. As mentioned above, it is possible to securely raise the temperature of the tread rubber 2 at an early stage of the operation while inhibiting the rolling resistance of the tire 1 from being increased.

In the tire 1 of the embodiment, an outside surface of the tread rubber 2 is provided with an adjacent portion 12 which is adjacent to the ground end portion 11 in an inner side in a tire width direction D1, wherein the adjacent portion 12 is formed by the rubber 8 having a smaller elastic modulus than the elastic modulus of the rubber 7 which forms the ground end portion 11, and wherein a dimension W1 of the ground end portion 11 in the tire width direction D1 is greater than a dimension W2 of the adjacent portion 12 in the tire width direction D1.

According to the structure mentioned above, the adjacent portion 12 is adjacent to the ground end portion 11 in the tire width direction D1, and is formed by the rubber 8 having the smaller elastic modulus than the elastic modulus of the rubber 7 which forms the around end portion 11. Further, since the dimension W1 of the ground end portion 11 in the tire width direction D1 is greater than the dimension W2 of the adjacent portion 12 in the tire width direction D1, the area which can suppress the deformation is enlarged in the outer side in the tire width direction D1 when turning and braking on the dry road surface. Therefore, it is possible to effectively improve the steering stability (the turning performance and the braking performance) against the dry road surface.

The tire 1 is not limited to the configuration of the embodiment described above, and the effects are not limited to those described above. It goes without saying that the tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

Figure 7:
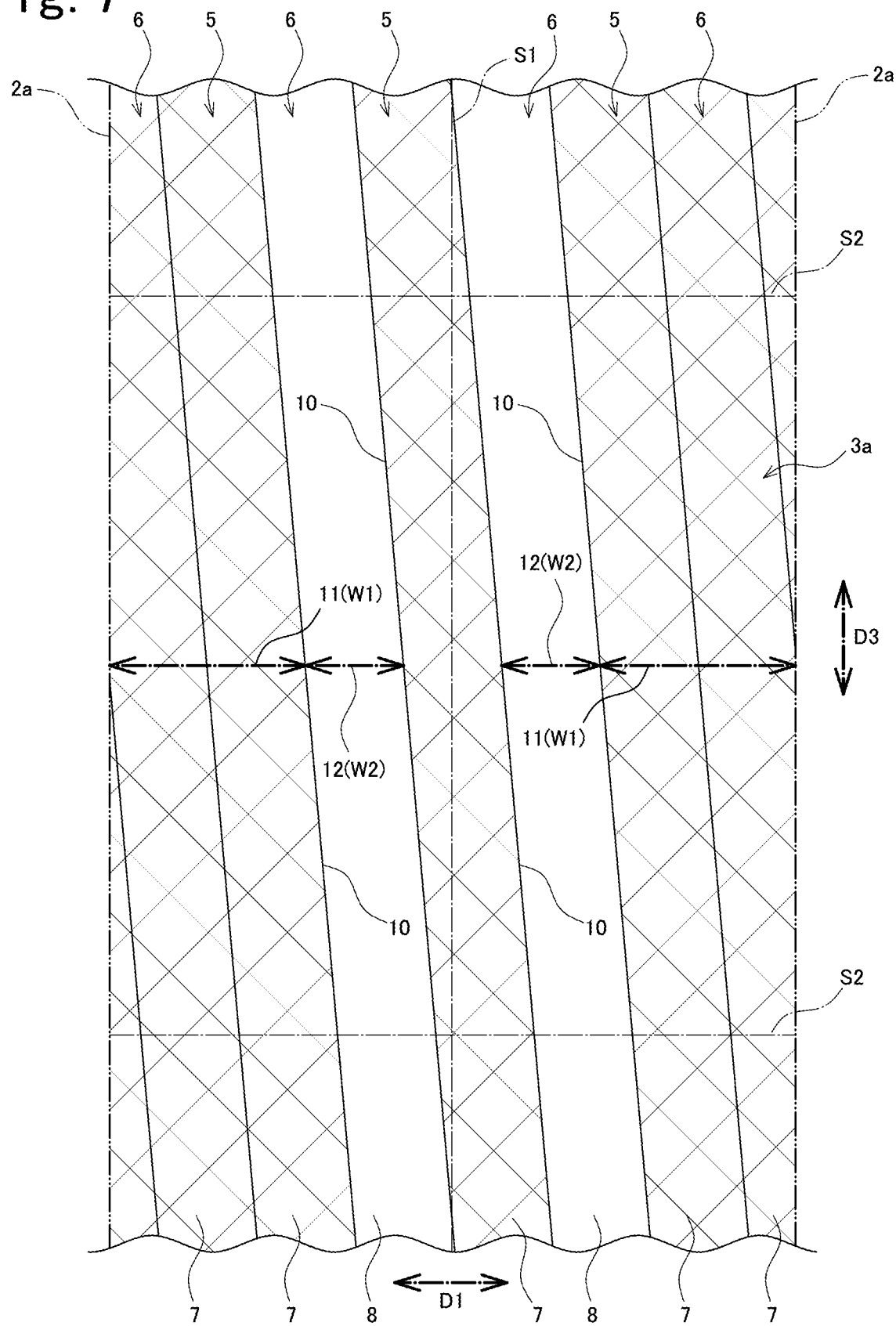
FIG. 7 is a development view of a substantial part of an outer layer of a cap rubber according to another embodiment, and is a drawing for describing a layout of rubber.

The tire 1 according to the embodiment mentioned above is structured such that the peripheral joint portion 9 is provided in the outer layer 3a and the inner layer 3b. However, the tire 1 is not limited to the structure mentioned above. For example, the peripheral joint portion 9 may be structured such as to be provided only in the inner layer 3b. Further, the outer layer 3a may be structured, as shown in FIG. 7, such as to be provided with only the width joint portion 10 in which the intersecting angle in the tire peripheral direction D3 is less than 10 degrees, and be provided with no peripheral joint portion 9.

Figure 8:
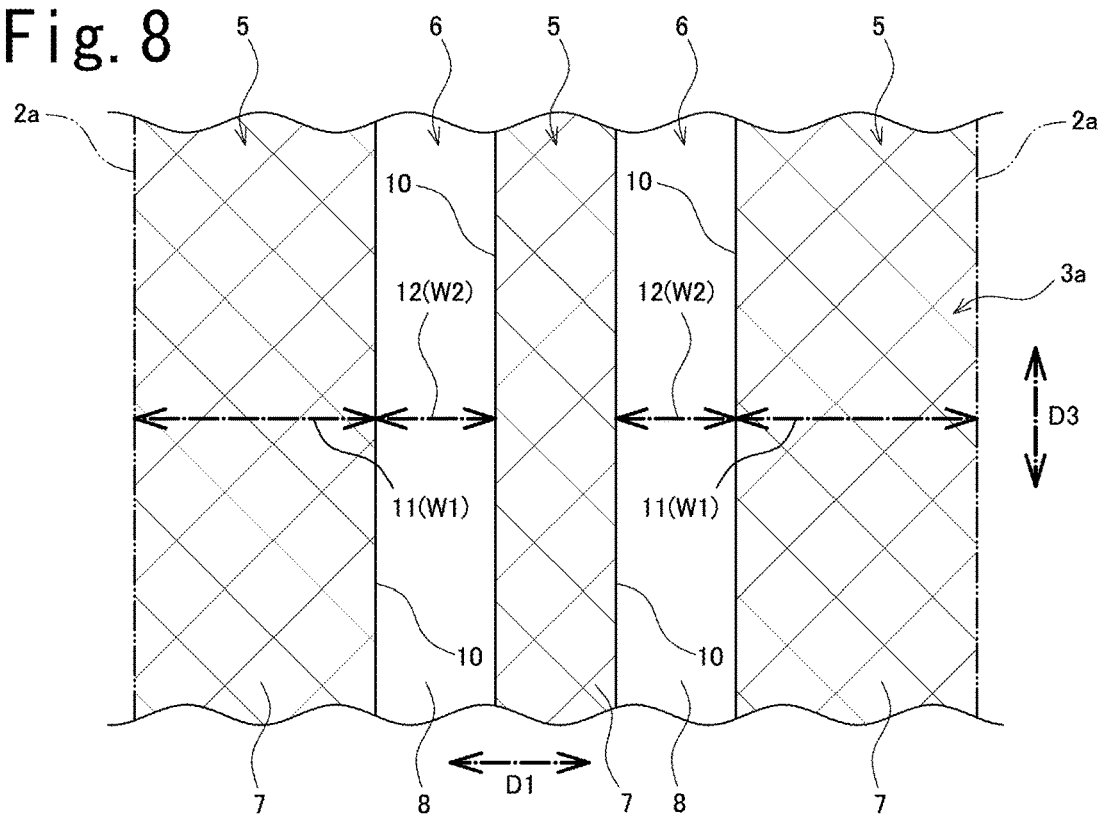
FIG. 8 is a development view of a substantial part of an outer layer of a cap rubber according to still another embodiment, and is a drawing for describing a layout of rubber.

Further, the tire 1 according to the embodiment mentioned above is structured such that the cross sectional shapes of the ribbon rubbers 5 and 6 are approximately the same. However, the tire 1 is not limited to the structure mentioned above. For example, the cross sectional shape of the first ribbon rubber 5 may be structured, as shown in FIG. 8, such as to be different. The dimension of the first ribbon rubber 5 constructing the ground end portion 11 according to FIG. 8 in the tire width direction D1 is greater than the dimensions of the other portions.

Figure 9:
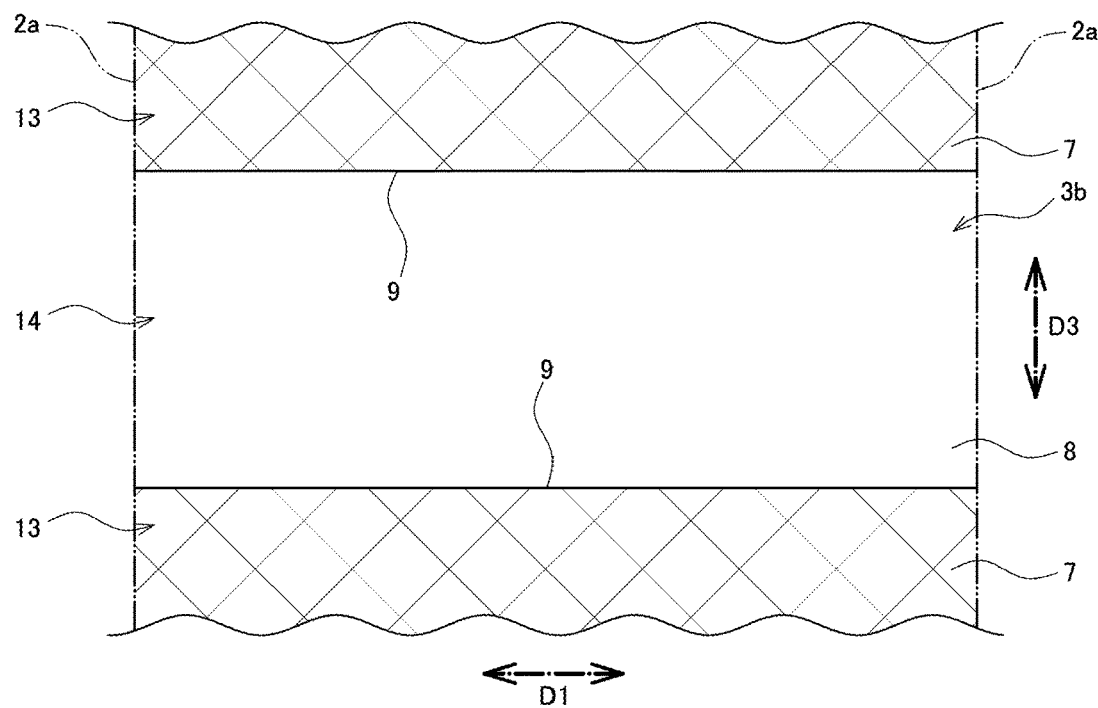
FIG. 9 is a development view of a substantial part of an inner layer of the cap rubber according to still another embodiment, and is a drawing for describing a layout of rubber.

Further, the tire 1 according to the embodiment mentioned above is structured such that the peripheral joint portions 9 are arranged so as to be inclined and intersect in relation to the tire peripheral direction D3. However, the tire 1 is not limited to the structure mentioned above. For example, the peripheral joint portion 9 may be structured, as shown in FIG. 9, such as to be arranged so as to be orthogonal and intersect in relation to the tire peripheral direction D3.

Further, the tire 1 according to the embodiment mentioned above is structured such that a part (the cap rubber 3) of the tread rubber 2 is formed by winding the cord-shaped ribbon rubbers 5 and 6. However, the tire 1 is not limited to the structure mentioned above. For example, at least apart of the tread rubber 2 may be structured, as shown in FIG. 9, such as to be formed by connecting the sheet-shaped sheet rubbers 13 and 14 in the tire peripheral direction D3.

Further, the tire 1 according to the embodiment mentioned above is structured such that the total area of the peripheral joint portions 9 in the outer layer 3a is smaller than the total area of the peripheral joint portions 9 in the inner layer 3b. However, the tire 1 is not limited to the structure mentioned above. For example, the total area of the peripheral joint portions 9 in the outer layer 3a may be structured such as to be equal to or more than the total area of the peripheral joint portions 9 in the inner layer 3b.

Further, the tire 1 according to the embodiment mentioned above is structured such that the dimension W1 of the ground end portion 11 in the tire width direction D1 is greater than the dimension W2 of the adjacent portion 12 in the tire width direction D1. However, the tire 1 is not limited to the structure mentioned above. For example, the dimension W1 of the ground end portion 11 in the tire width direction D1 may be structured such as to be equal to or less than the dimension W2 of the adjacent portion 12 in the tire width direction D1.

Further, the tire 1 according to the embodiment mentioned above is structured such that a partial layer (the outer layer 3a and the inner layer 3b of the cap rubber 3) in the tread rubber 2 is formed by a plurality kinds of rubber, rubbers 7 and 8, having the different elastic modulus. However, the tire 1 is not limited to the structure mentioned above. For example, all the layers of the tread rubber 2 may be structured such as to be formed by a plurality kinds of rubber, rubbers 7 and 8, having the different elastic modulus.

Further, the tire 1 according to the embodiment mentioned above is structured such that the tread rubber 2 is formed into three layers which are constructed by the outer layer 3a, the inner layer 3b and the base rubber 4. However, the tire 1 is not limited to the structure mentioned above. For example, the tread rubber 2 may be structured such as to be formed into one layer, two layers or four or more layers.

Further, the tire 1 according to the embodiment mentioned above is structured such that the peripheral joint portions 9 of the outer layer 3a and the inner layer 3b are arranged to be away at the distance corresponding to 180 degrees in the tire peripheral direction D3. However, the tire 1 is not limited to the structure mentioned above. For example, the peripheral joint portions 9 of the outer layer 3a and the inner layer 3b may be structured such as to be arranged to be away from the adjacent peripheral joint portions 9 in the tire peripheral direction D3 at a distance corresponding to 15 degrees to 180 degrees in the tire peripheral direction D3.

Further, the tire 1 according to the embodiment mentioned above is structured such that the peripheral joint portions 9 are formed by two rubbers 7 and 8 having the different elastic modulus. However, the tire 1 is not limited to the structure mentioned above. For example, the peripheral joint portions 9 may be structured such as to be formed respectively by two kinds of rubber which are selected from three or more kinds of rubber having different modulus.

Further, the tire 1 includes the tire before being vulcanized (the unvulcanized tire) and the tire after being vulcanized (the vulcanized tire). In the tire after being vulcanized, the boundary surfaces of the rubbers 7 and 8 can be observed by a cross section which is obtained by cutting the tire 1 with a sharp cutting tool. As a result, the arranged state of the rubbers 7 and 8 can be specified.

What is claimed is:

1. A tire comprising:
    a tread rubber comprising an outer layer which has an outside surface in a tire radial direction and an inner layer which is adjacent to the outer layer in an inner side in the tire radial direction,
    the tread rubber is formed by spirally winding at least a first ribbon rubber and a second ribbon rubber along a tire peripheral direction,
    the first ribbon rubber is formed of a first rubber, and the second ribbon rubber is of the first rubber and a second rubber, the elastic modulus of the first rubber is greater than the elastic modulus of the second rubber,
    the tread rubber is provided with peripheral joint portions where the first rubber and the second rubber each having a different elastic modulus are joined in a tire peripheral direction, a total area of the peripheral joint portions in the outer layer is smaller than a total area of the peripheral joint portions in the inner layer,
    the tread rubber is provided with width joint portions where the first rubber and the second rubber each having a different elastic modulus are joined in the tire width direction, and a total area of the width joint portions in the outer layer is smaller than a total area of the width joint portions in the inner layer, and
    a ground end portion of the outside surface of the tread rubber in a tire width direction is formed by a first portion formed by the first rubber of the first ribbon rubber and a second portion formed by the first rubber of the second ribbon rubber.

2. The tire according to claim 1, comprising an adjacent portion of an outside surface of the tread rubber in a tire width direction which is adjacent to the ground end portion in an inner side in a tire width direction,
    wherein the adjacent portion is formed by the second rubber, and
    wherein a dimension of the ground end portion in the tire width direction is greater than a dimension of the adjacent portion in the tire width direction.

3. The tire according to claim 1,
    wherein the ribbon rubbers are provided with parallel portions which are arranged in parallel to the tire peripheral direction, and inclined portions which are arranged so as to be inclined to the tire peripheral direction,
    wherein the peripheral joint portions are formed so that the inclined portions are joined to each other in the tire peripheral direction, and
    wherein the width joint portions are formed by joining the parallel portions to each other in the tire width direction.

4. The tire according to claim 1, wherein the tread rubber is provided with a plurality of peripheral grooves which extend along the tire peripheral direction, and
    wherein a peripheral groove arranged in the outermost side in the tire width direction is arranged in the ground end portion.

5. The tire according to claim 4, wherein the plurality of peripheral grooves are arranged to be away from all the peripheral joint portions and all the width joint portions.

6. The tire according to claim 1, wherein the elastic modulus of the first rubber is between 1.2 times and 5.0 times of the elastic modulus of the second rubber.

7. The tire according to claim 1, wherein a 100% tensile elastic modulus of the first rubber is between 0.6 MPa and 17.5 MPa, and a 100% tensile elastic modulus of the second rubber is between 0.5 MPa and 3.5 MPa.

8. A tire comprising:
a tread rubber comprising an outer layer which has an outside surface in a tire radial direction and an inner layer which is adjacent to the outer layer in an inner side in the tire radial direction,
the tread rubber is formed by a first rubber, and a second rubber, the elastic modulus of the first rubber is greater than the elastic modulus of the second rubber,
the tread rubber is provided with peripheral joint portions where the first rubber and the second rubber each having a different elastic modulus are joined in a tire peripheral direction, a total area of the peripheral joint portions in the outer layer is smaller than a total area of the peripheral joint portions in the inner layer,
the tread rubber is provided with width joint portions where the first rubber and the second rubber each having a different elastic modulus are joined in the tire width direction, and a total area of the width joint portions in the outer layer is smaller than a total area of the width joint portions in the inner layer,
a ground end portion of the outside surface of the tread rubber in a tire width direction is formed by the first rubber, the tread rubber is provided with a plurality of peripheral grooves which extend along the tire peripheral direction,
wherein a peripheral groove arranged in the outermost side in the tire width direction is arranged in the ground end portion, and
the plurality of peripheral grooves are arranged to be away from all the peripheral joint portions and all the width joint portions.

9. The tire according to claim 8, comprising an adjacent portion of an outside surface of the tread rubber in a tire width direction which is adjacent to the ground end portion in an inner side in a tire width direction,
the adjacent portion is formed by the second rubber, and
a dimension of the ground end portion in the tire width direction is greater than a dimension of the adjacent portion in the tire width direction.

10. The tire according to claim 8, wherein the tread rubber is formed by spirally winding a plurality of ribbon rubbers along the tire peripheral direction, wherein the ribbon rubbers are provided with parallel portions which are arranged in parallel to the tire peripheral direction, and inclined portions which are arranged so as to be inclined to the tire peripheral direction,
wherein the peripheral joint portions are formed so that the inclined portions are joined to each other in the tire peripheral direction, and
wherein the width joint portions are formed by joining the parallel portions to each other in the tire width direction.

11. The tire according to claim 8, wherein the elastic modulus of the first rubber is between 1.2 times and 5.0 times of the elastic modulus of the second rubber.

12. The tire according to claim 8, wherein a 100% tensile elastic modulus of the first rubber is between 0.6 MPa and 17.5 MPa, and a 100% tensile elastic modulus of the second rubber is between 0.5 MPa and 3.5 MPa.

* * * * *